United States Patent Office 3,549,325
Patented Dec. 22, 1970

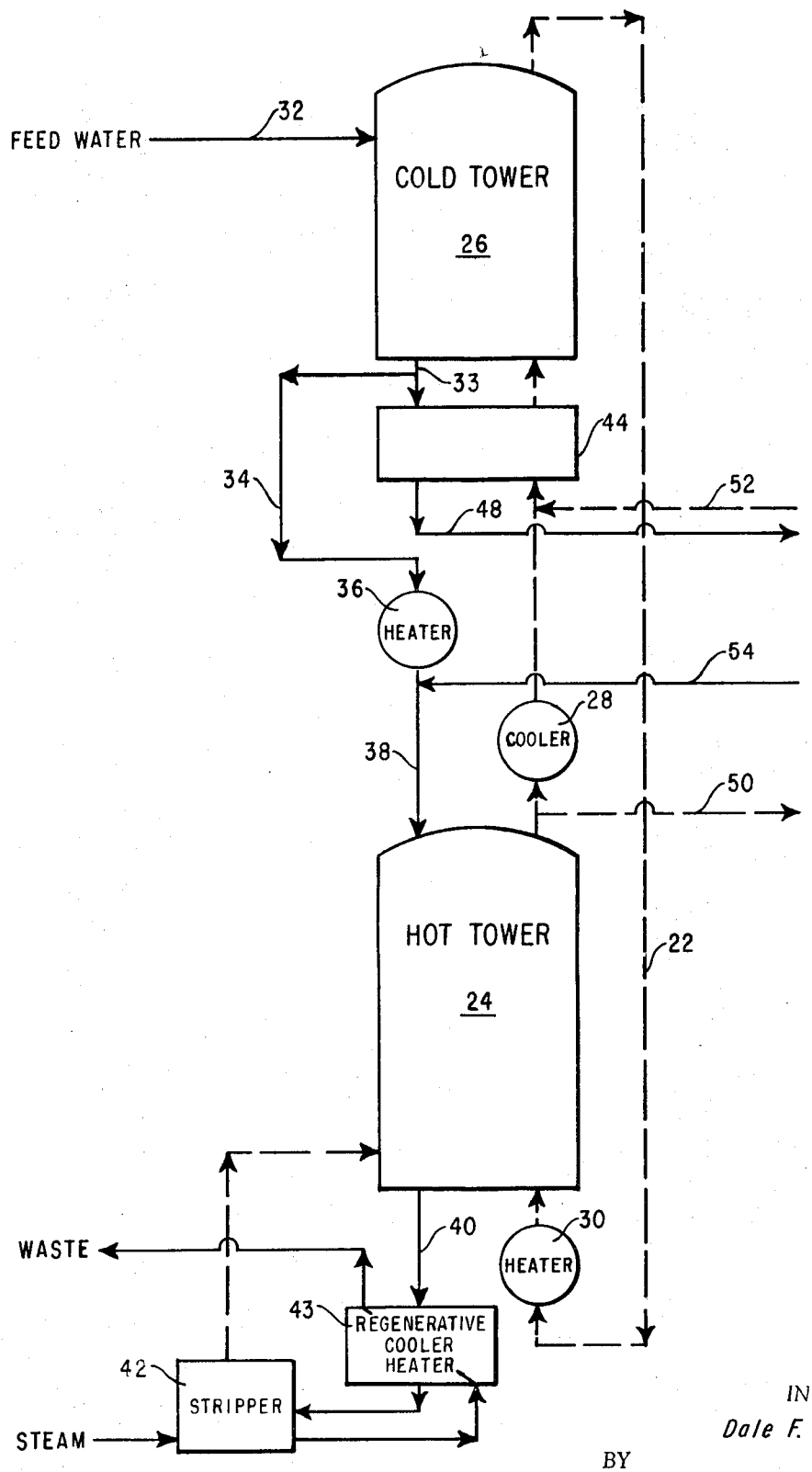

3,549,325
DUAL TEMPERATURE ISOTOPE
EXCHANGE PROCESS
Dale F. Babcock, Wilmington, Del., assignor to the United
States of America as represented by the United States
Atomic Energy Commission
Filed Apr. 16, 1968, Ser. No. 721,675
Int. Cl. C01b 5/02; B01j 1/00
U.S. Cl. 23—204                                    3 Claims

ABSTRACT OF THE DISCLOSURE

A liquid and gas each containing a desired isotope are made to flow countercurrently through two liquid-gas contacting towers. The towers are maintained at different temperatures to enrich the liquid in the isotope at one temperature and to enrich the gas in the isotope at the other temperature. A portion of the enriched liquid is contacted with the full flow of the enriched gas at a temperature suited for further enriching the liquid. This liquid portion is thereafter withdrawn as product of the process or as feed to a subsequent stage.

BACKGROUND OF THE INVENTION

The invention described herein was made in the course of, or under contract AT(07-2)-1 with the U.S. Atomic Energy Commission.

This invention relates to an improvement in the dual-temperature, isotope exchange process for concentrating an isotope of an element by its exchange between two substances at two temperatures. This process has been of major importance in the manufacture of heavy water.

In the breadth of application of the dual-temperature isotope exchange process to which the instant invention relates, a system is employed which comprises one or more stages of hot and cold liquid-gas contacting tower pairs wherein two substances are made to flow in countercurrent relationship. One of the two substances is fed to the first stage of the system, enriched in the isotope to be concentrated by preferential isotope exchange in the first tower, or towers, of the pair, or pairs, of towers constituting the first stage, depleted in the isotope in the corresponding second tower of that stage to below the feed concentration and discharged from the system as waste. The other substance is continuously circulated through the system as the separating agent in an essentially closed recycle flow. A portion of the flow of one of the substances is withdrawn from that portion of the system in which its concentration of the isotope is high. In the application of the process to the concentration of heavy water, the deuterium isotope is exchanged between water feed and continuously circulated hydrogen sulfide gas to attain concentration of the deuterium in the water.

Heavy water, deuterium oxide ($D_2O$), is useful as a moderator for nuclear reactors. It has been most commonly obtained from natural water where its concentration, or more correctly, the ratio of deuterium atoms to the total hydrogen atoms present, is only about one part in 7,000. This very dilute concentration and the similarities of the properties of $D_2O$ with $H_2O$ makes heavy water expensive to produce. This is true even though produced, as at present, in commercial scale quantities of hundreds of tons/year.

The production facilities which have produced nearly all of the free world's present supply of heavy water are described in considerable detail in A.E.C. R&D Report DP-400: Production of Heavy Water—Savannah River and Dana—Technical Manual, W. P. Bebbington and V. R. Thayer, eds., J. F. Proctor, comp., Du Pont Co., Aiken, S.C. (1959) and by "Production of Heavy Water," by W P. Bebbington and V. R. Thayer, Chemical Engineering Progress, vol. 55, No. 9, pp. 70–78 (September 1959).

The process practiced at the Savannah River production facilities (and at the Dana facilities until its shutdown in 1957) is a specific application of the dual-temperature, isotope exchange process. It has come to be known as the "GS" process and will be referred to as such hereinafter. The principles governing it are now well known and are fully explained in the above references and also in U.S. Pat. No. 2,787,526 entitled, "Method of Isotope Separation," issued Apr. 2, 1957 to J. S. Spevack, assignor to the U.S. Government. The brief summary of these principles in the paragraphs immediately following will facilitate an understanding of the invention.

While water is a compound of hydrogen and oxygen represented by the formula $H_2O$, any body of naturally occurring water contains a significant quantity of hydrogen-oxygen compounds wherein one of the hydrogen atoms is the heavier isotope deuterium. This is expressed by the formula HDO. (At higher concentrations of deuterium, the isotopic form $D_2O$ becomes significant.) In naturally occurring water about $\frac{1}{7000}$ of the hydrogen atoms present are the deuterium isotope. Similiarly, hydrogen sulfide while mostly $H_2S$, also contains a measurable quantity of the isotopic form HDS.

When hydrogen sulfide gas and liquid water are intimately contacted, there is a rapid equilibration of the deuterium isotope between oxygen compounds and sulfur compounds thereby fixing the relative proportions of $H_2O$, HDO, $H_2S$ and HDS. Deuterium has a substantial preference for combination with oxygen rather than sulfur. However, this preference is stronger at a low temperature than at a higher temperature. This may be conveniently expressed by the equation.

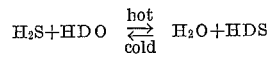

$$H_2S + HDO \underset{\text{cold}}{\overset{\text{hot}}{\rightleftarrows}} H_2O + HDS$$

This difference in the equilibrium distribution of deuterium at different temperatures is the mechanism that the GS process exploits to effect concentration of $D_2O$.

In the GS process, water flows down through a cold water tower and then through a hot tower in countercurrent relation to an upward flow of hydrogen sulfide gas. The water is progressively enriched in deuterium as it passes downward through the cold tower and progressively depleted in deuterium as it passes downward through the hot tower. Conversely, the hydrogen sulfide stream is enriched in deuterium as it passes upward through the hot tower and depleted in deuterium as it passes upward through the cold tower. Accordingly, the concentration of deuterium in each of the streams is maximum at the bottom of the cold tower and at the top of the hot tower, or figuratively speaking, between the towers. A portion of the enriched water between the hot and cold towers is withdrawn as a stage product a stream to be carried forward for further processing or removed as product of the process, the depleted water disposed of as waste, and the hydrogen sulfide stream continuously recycled as the separating agent. Stages subsequent to the first may be coupled thereto by a cascade flow of a portion of one or both of the streams.

The capital investment in equipment necessary for practicing the GS process is very high. The capital investment at the Dana and Savannah River Plants amounted to about $120.00 per "annual pound" for the GS portion of the plants alone. Enormous quantities of fluids must be handled. Heretofore, extraction of about 20% of the deuterium in the feed water has been considered to be the economic rate. At that recovery rate, about 35,000 pounds of water must be fed for every one pound of $D_2O$ recovered. The gas flow rate per pound of $D_2O$ produced is even greater. Heretofore, about 140,000 pounds of gas has been cycled between the towers for every pound of $D_2O$ extracted. As will be readily appreciated by those familiar with the chemical engineering aspects of the GS process, it is this enormous gas flow that largely determines the size of the towers and other required equipment, the energy input per unit of product, and accordingly, the cost of the $D_2O$ produced. By far the largest portion of the energy consumed by the process is related to the heat reversals and attendant loss of nonrecoverable heat associated with this enormous $H_2S$ gas flow. The incentive in increasing the productivity of the process, and particularly with relation to the gas flow is, therefore, apparent.

The relationship of the liquid and gas flows, however, must be controlled within narrow limits in order for the process to be productive. As explained in A.E.C. R&D Report DP-3: S-Process Pilot Plant—First Run Results and Process Principles, D. F. Babcock, C. B. Buford, Jr., and J. W. Morris, Du Pont Co., Wilmington, Del. (1951), and further elucidated in J. W. Morris and W. C. Scotten, Chemical Engineering Progress Symposium Series, vol. 58, No. 39 (1962), variation from optimum liquid-gas ratios ($L/G$) by as little as 5%, in either direction drastically decreases productivity of the plant.

I have found, however, that the productivity of the GS process can be significantly improved by purposely violating—and by more than 5%—the optimum $L/G$ ratios given in the above references in certain portions of the system. Since the improvement is obtained without any significant increase in the gas flow rate, the gain in productivity is obtained with only minor additional equipment and at economically advantageous per unit operating costs.

SUMMARY OF INVENTION

It is an object of this invention to increase the productivity of the dual temperature isotope exchange process. It is a further object of this invention to increase the productivity of that process by modification of the system that requires relatively little additional equipment and achieves the increase in productivity at economically attractive per unit operating costs. It will be understood that while as a matter of convenience the invention is described herein in relation to the specific application of the dual temperature isotope exchange process wherein the concentration of deuterium is effected by its exchange between $H_2S$ and $H_2O$—which at present is the only economically significant application of the process—the invention has general application to the dual temperature isotope exchange process. This general application of the invention will be readily appreciated by those familiar with this process.

While as mentioned above and more fully developed in the identified report, DP-3, and Morris and Scotten paper, operation of each tower within a narrow limit of a fixed optimum $L/G$ ratio has been considered essential to the operability of the GS process, I have found that while this is true in a general sense, departure from the fixed $L/G$ ratios at particular limited locations in particular manner, is not only permissible, but actually increases the productivity of the process. The particular location to which the invention of the instant application is directed is below the cold tower of the first or a subsequent stage or in a lower portion thereof. My copending applications S.N. 721,674 and S.N. 721,676, each entitled, "Improvement in Dual Temperature Isotope Exchange Process," and each filed on Apr. 16, 1968 are directed to other particular locations.

According to the instant invention, increased productivity, realized as increased production or higher concentration product, or both, is obtained by separating the flow of water at the bottom of a cold tower into two streams, the first of which is further contacted with substantially the entire enriched $H_2S$ flow of the particular stage. Thereafter at least a portion of that first stream is sent forward as product or feed for a subsequent stage. The second stream is sent directly to the hot tower of the respective stage.

By this separation of the water flow, the entire flow of enriched $H_2S$ is equilibrated against only that small portion of the water flow that is withdrawn as product or sent forward as feed to a subsequent stage. This has the effect of increasing the deuterium concentration in the gas at each tray in the portion of the tower, wherein the separate flows are maintained, thereby driving more deuterium per unit of flow into the smaller water stream than would be the case without the separation.

Optimum benefit from the improved water flow according to the invention would in general be attained by routing only that small portion of the water flow that is to be carried forward to a subsequent stage against the entire enriched $H_2S$ flow for only a small section relative to the entire height of the cold tower. However, a benefit will be obtained whether a large or small portion of the water flow is made to flow in this manner.

While the foregoing briefly sumarizes the invention and its objects and advantages, these and additional objects and advantages will appear and the summarized explanation of the invention understood from the following description of an embodiment thereof, the most novel features of which will be particularly pointed out hereinafter in connection with the appended claims.

BRIEF DESCRIPTION OF DRAWING

The single figure of drawing is a schematic diagram showing the flows of $H_2O$ and $H_2S$ in a GS process arrangement in accordance with the invention.

DESCRIPTION OF PREFERRED EMBODIMENTS

Referring to the drawing, the flow of the liquid water and hydrogen sulfide gas in accordance with the invention is illustrated in diagrammatic manner. For ease in understanding the flow of these substances, the components of the heat recovery loops have been omitted and the required changes in enthalpy in the various streams are heat-reversals indicated simply as heaters and coolers in the respective flow lines. Conventional items such as gas blowers, liquid pumps, valves, etc., have been omitted from the drawings since their use will be readily understood by those familiar with chemical engineering processes. The liquid water flows are represented by solid lines and the $H_2S$ gas flows by conventional dotted lines throughout.

With the exception of the improvement according to the invention, which will be specifically pointed out hereinafter, the drawing is a conventional flow sheet for the GS process. An essentially closed cycle 22 of $H_2S$ gas circulates upwardly through hot tower 24, cold tower 26 and then returned to hot tower 24. The structure of liquid-gas contacting towers 24 and 26 may be of any suitable design well known in the chemical engineering art. The $H_2S$ gas is cooled before entry into cold tower 26 and heated and humidified prior to its return to hot tower 24. These changes in enthalpy are figuratively represented by cooler 28 and heater-humidifier 30.

The feed water for the system, after suitable preconditioning as may be required by equipment not shown, enters the top of cold tower 26 through conduit 32. The usual temperature for the cold tower is about 30° C. As this water flows down the cold tower it is sequentially contacted by the countercurrent flow of $H_2S$ gas, such contacting being enhanced by any suitable means, such as packing material, contacting trays, etc., in the towers. The water is continually enriched in deuterium as it proceeds through cold tower 26 due to the higher preference of the deuterium isotope to combine with oxygen then with sulfur. Conversely, the $H_2S$ gas is continually depleted in deuterium as it proceeds up the cold tower in countercurrent relation to the water. The enriched water exits cold tower 26 via conduit 33 and the major portion transported therefrom through conduit 34. It is heated by suitable means shown figuratively as liquid-heater 36 to about hot tower temperature, most usually about 140° C., and introduced into the top of hot tower 24 through conduit 38. As the water proceeds down the hot tower it is continually depleted in deuterium content due to the relatively lower preference of the deuterium for the oxide form at the higher temperature. Water depleted in deuterium is discharged from the bottom of the tower through conduit 40 and after necessary stripping of the $H_2S$ gas dissolved therein, such as in stripper 42, and heat removal by useful work such as by regenerative heating of other streams (illustrated figuratively by regenerative cooler-heater 43) the water depleted in deuterium is discharged to waste.

The improved water flow according to the invention is shown in relation to the bottom of the cold tower of the illustrated first stage. The enriched water flow leaving cold tower 26 through conduit 33 is divided into a stage product stream and a hot tower feed stream. As previously stated, the hot tower feed stream includes the major portion of the enriched water flow and is routed to heater 36 through conduit 34. The stage product stream is brought into sequential contacting with the entire $H_2S$ flow in the liquid-gas contacting tower portion 44. This stage product stream is enriched to a higher deuterium concentration in the relatively small tower portion 44 than would be the case if the entire water flow passed therethrough. The stage product stream is ordinarily that portion of the enriched water flow removed as product of the process or carried forward to a subsequent stage via conduit 48. Coupling of the illustrated first stage with subsequent stages can be further facilitated by the cascade flow of a portion of the gas flow through lines 50 and 52 and return water line 54 in a conventional manner.

While small liquid-gas contacting portion 44 is shown as being physically separate from cold tower 26, it will be appreciated that it ordinarily would be an integral bottom portion of cold tower 26 since the gas flow through each of them would be identical. Other arrangements, however, such as on the top of the second stage cold tower, are also practicable.

In an existing plant, the improved flow according to the invention can be obtained by removing all but that small portion of the water flow going forward to the subsequent stage from the cold tower at some level in the lower portion thereof. Taking the Savannah River plant described in the above cited references as a specific example, about ¾ of the total water flow is removed from the cold tower at the fifth tray from the bottom of the tower. The cold tower of that plant has a total of 70 actual trays. The improvement in productivity of such arrangement with respect to that particular plant is about 1%. Since this increase in productivity is obtained by extremely minimal expenditure, it is of significant economic interest.

While the precise number of trays to be utilized in the improved flow described herein is a matter within the skill of the chemical engineering art, it will not be greater than about one third of the total cold tower height.

It will be appreciated that the improved flow described hereinabove can be utilized in conjunction with one or both of the improvements described in my two copending applications identified hereinabove, although the total gains achieved thereby will be somewhat less than the sum of the gains realized by individual application of the respective improvements.

While the fundamental novel features of the invention have been shown and described and pointed out as applied to a preferred embodiment, it will be understood that various omissions and substitutions and changes may be made by those skilled in the art within the principle and scope of the invention as expressed in the appended claims.

What is claimed is:

1. In the dual-temperature, isotope-exchange process for concentrating an isotope of an element by its exchange between two substances containing said element, one in liquid and one in gas phase, in a system comprising at least one stage of hot and cold liquid-gas contacting tower pairs through which said substances are made to flow in countercurrent relationship, the liquid substance being:

fed to the first tower of a stage of said system at a first concentration of the isotope to be concentrated, enriched in concentration of said isotope by preferential isotope exchange in said first tower, said enriched liquid substance being separated into a minor portion and a major portion thereof, said minor portion of enriched liquid being withdrawn from said stage as product of said process or as feed for a subsequent stage, and said major portion of enriched liquid being depleted in concentration of said isotope by said exchange in the second of said pair of towers, the gaseous substance being continuously circulated through said pairs of towers in countercurrent relation to said liquid substance in essentially closed recycle flow and enriched in concentration of said isotope in said second tower, and the depleted liquid substance being discharged from the first stage as waste, the improvement comprising further contacting said minor portion of enriched liquid with substantially the entire flow of enriched gaseous substance of the respective stage at about first tower temperature prior to withdrawal from said stage, said further contacting being accomplished in a tower portion less than about one third of the first tower height.

2. In the dual-temperature, isotope-exchange process for concentrating the deuterium isotope by its exchange between water and hydrogen sulfide in a system comprising at least one stage of hot and cold liquid-gas contacting tower pairs through which liquid water and hydrogen sulfide gas are made to flow in countercurrent relationship, the water being:

fed to the cold tower of a stage of said system, enriched in deuterium concentration by preferential isotope exchange in said cold tower of said stage, said enriched water being separated into a minor portion and a major portion thereof, said minor portion of enriched liquid being withdrawn from said stage as product of said process or as feed for a subsequent stage, and said major portion of enriched liquid being depleted in deuterium concentration by said exchange in the associated hot tower of that stage, the hydrogen sulfide being continuously circulated through said tower pairs in countercurrent relation to the water in an essentially closed recycle flow and enriched in deuterium concentration in said hot tower, the improvement comprising further contacting said minor portion of enriched liquid with substantially the entire flow of enriched hydrogen sulfide of that stage at about cold tower temperature, said further contacting being accomplished in a tower portion less than about one-third of the cold tower height.

3. The improvement according to claim 2 wherein said tower portion is an integral bottom portion of the cold tower.

References Cited

UNITED STATES PATENTS 2,787,526   4/1957   Spevack _____ 23—204

OSCAR R. VERTIZ, Primary Examiner

H. S. MILLER, Assistant Examiner

U.S. Cl. X.R.

23—283